United States Patent [19]

Hashimoto et al.

[11] Patent Number: 5,039,780

[45] Date of Patent: Aug. 13, 1991

[54] COPOLYESTER HAVING GAS-BARRIER PROPERTY

[75] Inventors: Mikio Hashimoto; Norio Kaneshige, both of Iwakuni, Japan

[73] Assignee: Mitsui Petrochemical Industries, Ltd., Tokyo, Japan

[21] Appl. No.: 432,855

[22] Filed: Nov. 7, 1989

[30] Foreign Application Priority Data

Nov. 8, 1988 [JP] Japan .................................. 63-281800
Dec. 26, 1988 [JP] Japan .................................. 63-328733
Dec. 26, 1988 [JP] Japan .................................. 63-328737

[51] Int. Cl.$^5$ ........................ C08G 63/02; C08G 63/18
[52] U.S. Cl. ................................... 528/194; 528/176; 528/190; 528/195; 525/437; 525/444
[58] Field of Search ................... 528/176, 190, 194; 525/98, 411, 480

[56] References Cited

U.S. PATENT DOCUMENTS

| | | | |
|---|---|---|---|
| 3,972,852 | 8/1976 | Inata et al. | 528/194 |
| 4,060,516 | 11/1977 | Kuratsuji et al. | 528/272 |
| 4,100,142 | 7/1978 | Schaefer et al. | 528/272 |
| 4,390,683 | 6/1983 | Yatsu et al. | 528/194 |
| 4,692,506 | 9/1987 | Yatsu et al. | 528/296 |

*Primary Examiner*—Harold D. Anderson
*Assistant Examiner*—T. Mosley
*Attorney, Agent, or Firm*—Sherman & Shalloway

[57] ABSTRACT

A copolyester having an intrinsic viscosity, measured in o-chlorophenol at 25° C., of 0.3 to 1.5 dl/g and being derived from dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2-hydroxyethoxy)benzene units; a gas barrier imparting agent composed of the copolyester; a polyester composition composed of (A) a polyethylene terephthlate and (B) the copolyester; and a film, a preform and a container composed of the polyester composition. Also provided are a polyester laminated structure, a stretched laminated structure, a preform and a laminated blow-molded article each composed of (C) a polyalkylene terephthalate layer and (D) a copolyester layer composed of the copolyester or the polyester composition.

8 Claims, No Drawings

COPOLYESTER HAVING GAS-BARRIER PROPERTY

BACKGROUND OF THE INVENTION

1. Field of the Invention

This invention relates to a copolyester and a gas-barrier property imparting agent, and more specifically, to a copolyester having excellent gas-barrier property and surface properties and a high glass transition temperature and a gas-barrier property imparting agent composed of the copolyester.

The invention also relates to a polyester composition and a film, a preform and a container composed of the polyester composition, and more specifically, to a polyester composition having excellent gas-barrier property, surface properties and transparency and comprising (A) polyethylene terephthalate and (B) the aforesaid copolyester, and to a film, a preform and a container composed of the polyester composition.

Furthermore, this invention relates to a polyester laminated structure, and its use, and more specifically, to a polyester laminated structure having excellent moldability, mechanical properties and composed of (C) a polyalkylene terephthalate layer and (D) a copolyester layer composed of the aforesaid copolyester or a polyester composition, and to its use.

2. Description of the Prior Art

Glass has widely been used as a material for containers for holding various articles, for example seasonings, oils, wines and liquors, beer, soft drinks including carbonated drinks, cosmetics, and detergents. Glass containers have excellent gas-barrier property, but their cost of production is high. It is the usual practice therefore to recover the used empty containers and recycle them for use. The glass containers, however, are heavy and involve high transportation expenses. Moreover, they are susceptible to breakage and inconvenient to handle.

To solve this problem, the glass containers have been superseded by various plastic containers, and various plastic materials are used according to the kind of articles to be held and the purpose of use. Polyethylene terephthalate (PET) has excellent thermal resistance, impact strength, gas-barrier property and transparency, and is used as a material for containers used to hold seasonings, refreshing drinks, detergents and cosmetics. In the case of containers for beer and carbonated drinks which most rigorously require gas-barrier property, polyethylene terephthalate is still not entirely satisfactory. To use polyethylene terephthalate for such containers, it is necessary to improve gas-barrier property by increasing the thickness of the containers.

Polyester containers have shown an increasing demand, but to expand their use further, it is strongly desired to develop polyesters having excellent gas-barrier property and melt-moldability.

Japanese Laid-Open Patent Publication No. 84866/1981 discloses a multilayer container having a thin wall portion in which the outermost layer and the innermost layer are composed of a polyester having ethylene terephthalate as main recurring units, an interlayer is composed of a polyamide obtained by reacting a dibasic acid component and a diamine component, the diamine component being m-xylylenediamine or a mixture of it with p-xylylenediamine, and the resin constituting the thin wall portion is oriented in at least one direction. This patent document describes that the above container has excellent oxygen gas-barrier property while retaining the excellent dynamical properties, transparency and chemical resistance of the polyester.

Japanese Laid-Open Patent Publication No. 183248/1983 discloses a biaxially stretched blow molded bottle in which both inside and outside surface layers are composed of polyethylene terephthalate and a layer intermediate between them is composed of a mixture of polyethylene terephthalate and a xylylene group-containing polyamide.

Japanese Laid-Open Patent Publication No. 64624/1984 discloses a polyalkylene isophthalate such as polyethylene isophthalate and its copolymer, and a packaging material having good gas-barrier property with respect to oxygen and carbon dioxide gas which is molded from them.

Japanese Laid-Open Patent Publication No. 87049/1984 discloses a multilayer packaging material composed of a layer of a polyalkylene isophthalate or its copolymer and a layer of a polyalkylene terephthalate such as polyethylene terephthalate or its copolymer, and a molded article such as a bottle formed from it.

Japanese Laid-Open Patent Publication No. 64658/1984 proposes a method of blending polyethylene isophthalate and polyethylene terephthalate.

However, the polyethylene isophthalates described in the above-cited patent documents contains high-melting oligomers, and these oligomers adversely affect the physical properties of the resulting molded articles.

To improve the gas-barrier property of PET, a copolyester was proposed which is prepared by copolymerizing isophthalic acid as a dicarboxylic acid component and ethylene glycol and 1,3-bis(2-hydroxyethoxy)benzene as a dihydroxy compound component (see Japanese Laid-Open Patent Publication No. 167617/1983).

If an article such as a container is molded from a polyester resin containing moisture, hydrolysis takes place and the mechanical properties of the molded article are degraded. It is necessary therefore to dry the polyester resin before molding. However, since an isophthalate-type copolyester containing a large amount of isophthalic acid as the dicarboxylic acid component has a lower crystallinity and glass transition temperature (Tg) than a terephthalate-type copolyester, it can be dried only at low temperatures. Accordingly, to obtain an isophthalate-type polyester having a low water content, long periods of time are required for its drying. If the isophthalate copolyester is dried at temperatures higher than the glass transition temperature, the copolyester will melt-adhere to itself.

Usually, polyethylene terephthalate is dried at a temperature of 110° C. to 160° C. If the polyethylene terephthalate dried at the above temperatures and the isophthalate-type copolyester dried at lower temperatures are dry-blended immediately after drying, the isophthalate-type copolyester will be heated to a temperature higher than the glass transition temperature by the polyethylene terephthalate which is still at a considerably high resin temperature. Consequently, the pelletized isophthalate-type copolyester will get out of shape or the copolyester pellets melt-adhere to one another. Consequently, it is difficult to mix them uniformly.

For this reason, it has been desired to develop an isophthalate-type copolyester having a high glass transition temperature (Tg) and excellent thermal resistance.

An isophthalate-type copolyester having copolymerized therein bis(4-beta-hydroxyethoxyphenyl)sulfone was proposed as a copolyester having a high glass transition temperature (Tg) (see Japanese Laid-Open Patent Publication No. 167617/1983).

The use of bis(4-beta-hydroxyethoxyphenyl)sulfone makes the isophthalate-type copolyester slightly higher in glass transition temperature (Tg), but its Tg elevating effect is not sufficient. In addition, if its gas-barrier property is degraded, or the copolyester is colored or the monomeric components bleed out, the polyester is undesirable in view of food sanitation.

SUMMARY OF THE INVENTION

It is an object of this invention to solve the above problems in the prior art, and to provide an isophthalate-type copolyester being free from high-melting oligomers and having a high glass transition temperature and excellent gas-barrier property and surface properties.

Another object of this invention is to provide a gas-barrier property imparting agent comprising the above isophthalate-type copolyester. Another object of this invention is to solve the problems associated with the prior art discussed above, and to provide a polyester composition which does not contain high-melting oligomers, can be dried at a high speed and has excellent thermal resistance, impact strength, surface properties, transparency and gas-barrier properties.

Another object of this invention is to provide a film, a preform and a container composed of the above polyester composition.

Another object of this invention is to solve the problems associated with the prior art discussed above, and to provide a polyester laminated structure which is free from high-melting oligomers, and has excellent moldability, stretchability, gas-barrier property, especially with respect to oxygen and carbon dioxide gas, thermal resistance, impact strength, surface properties, transparency, electrical properties and chemical resistance.

Another object of this invention is to provide a stretched laminated structure, a preform for blow molding and a laminated blow-molded article each composed of the above polyester laminated structure and having excellent gas-barrier property, especially with respect to oxygen and carbon dioxide gas, thermal resistance, impact strength, surface properties, transparency, electrical properties and chemical resistance.

The above objects are achieved in accordance with this invention by a copolyester having an intrinsic viscosity, measured in o-chlorophenol at 25° C., of 0.3 to 1.5 dl/g and being derived from dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2-hydroxyethoxy)benzene units.

The above objects are also achieved in accordance with this invention by a gas-barrier property imparting agent composed of a copolyester having an intrinsic viscosity, measured in o-chlorophenol at 25° C., of 0.3 to 1.5 dl/g and being derived from a dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2-hydroxyethoxy)benzene units.

The above objects are further achieved in accordance with this invention by a polyester composition comprising (A) 50% to 95% by weight of polyethylene terephthalate and (B) 50% to 5% by weight of a copolyester having an intrinsic viscosity, measured in o-chlorophenol at 25° C., of 0.3 to 1.5 dl/g and being derived from dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2-hydroxyethoxy)benzene units.

The above objects are further achieved in accordance with this invention by a film composed of a polyester composition comprising (A) 50% to 95% by weight of polyethylene terephthalate and (B) 50% to 5% by weight of a copolyester having an intrinsic viscosity, measured in o-chlorophenol at 25° C., of 0.3 to 1.5 dl/g and being derived from dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2-hydroxyethoxy)benzene units.

The above objects are further achieved in accordance with this invention by a preform composed of a polyester composition comprising (A) 50% to 95% by weight of polyethylene terephthalate and (B) 50% to 5% by weight of a copolyester having an intrinsic viscosity, measured in o-chlorophenol at 25° C., of 0.3 to 1.5 dl/g and being derived from dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2-hydroxyethoxy)benzene units.

The above objects are further achieved in accordance with this invention by a container composed of a polyester composition comprising (A) 50% to 95% by weight of polyethylene terephthalate and (B) 50% to 5% by weight of a copolyester having an intrinsic viscosity, measured in o-chlorophenol at 25° C., of 0.3 to 1.5 dl/g and being derived from dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2-hydroxyethoxy)benzene units.

The above objects are also achieved in accordance with this invention by a polyester laminated structure composed of (C) a polyalkylene terephthalate layer and (D) a copolyester layer, the copolyester layer (D) derived from dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2-hydroxyethoxy)benzene units, or a copolyester composition comprising said copolyester and polyethylene terephthalate.

The above objects are further achieved in accordance with this invention by a stretched polyester laminated structure composed of (C) a polyalkylene terephthalate layer and (D) a copolyester layer composed of a copolyester derived from dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2-hydroxyethoxy)benzene units or a copolyester composition comprising said copolyester and polyethylene terephthalate, said polyalkylene terephthalate layer (C) and the copolyester layer (D) being stretched.

The above objects are also achieved in accordance with this invention by a preform for a laminated blow-molded article, said preform composed of (C) a polyalkylene terephthalate layer and (D) a copolyester layer, the copolyester layer (D) being composed of a copolyester derived from dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2-hydroxyethoxy)benzene units, or a copolyester composition comprising said copolyester and polyethylene terephthalate.

The above objects are also achieved in accordance with this invention by a polyester laminated blow-molded article composed of (C) a polyalkylene terephthalate layer and (D) a copolyester layer, the copolyester layer (D) being composed of a copolyester derived from dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2-hydroxyethoxy)benzene units, or a copolyester composition comprising said copolyester and polyethylene terephthalate.

DETAILED DESCRIPTION OF THE PREFERRED EMBODIMENTS

The copolyester of this invention is characterized in that the dicarboxylic acid units (recurring units derived from a dicarboxylic acid) consist of 95 to 60 mole % of isophthalic acid units and 5 to 40 mole % of 2,6-naphthalenedicarboxylic acid units and the dihydroxy compound units (recurring units derived from a dihydroxy compound) consist of 95 to 70 mole % of ethylene glycol units and 5 to 30 mole % of 1,3-bis(2-hydroxyethoxy)benzene units, and that it has an intrinsic viscosity, measured in o-chlorophenol at 25° C., of 0.3 to 1.5 dl/g.

Since the copolyester of the invention uses isophthalic acid units and 2,6-naphthalenedicarboxylic acid units as the dicarboxylic acid units and ethylene glycol units and 1,3-bis(2-hydroxyethoxy)benzene units as the dihydroxy compound units, it does not contain high-melting oligomers and has excellent gas-barrier property and surface properties and a high glass transition temperature.

The copolyester of this invention will be described below specifically.

The copolyester of the invention can be obtained by co-condensation reaction of the following dicarboxylic acids and dihydroxy compounds.

The dicarboxylic acids used in this invention are 95 to 60 mole %, preferably 90 to 70 mole %, of isophthalic acid, and 5 to 40 mole %, preferably 10 to 30 mole %, of 2,6-naphthalenedicarboxylic acid.

If the isophthalic acid is used in an amount of more than 95 mole %, the resulting copolyester does not have so high a glass transition temperature. If it is used in an amount of less than 60 mole %, the glass transition temperature of the resulting copolyester has too high a glass transition temperature, and a blend of the resulting copolyester and polyethylene terephthalate, or a multi-layer laminate of the copolyester cannot be sufficiently stretched.

In the present invention, another dicarboxylic acid may be used in addition to the isophthalic acid and 2,6-naphthalenedicarboxylic acid in an amount which does not impair the properties of the resulting copolyester. Examples of the other dicarboxylic acid are terephthalic acid, phthalic acid, and 2-methylterephthalic acid. As the dihydroxy compounds, ethylene glycol and 1,3-bis(2-hydroxyethoxy)benzene are used in the invention. These dihydroxy compounds are used in such amounts that the hydroxy compound component consists of 95 to 70 mole %, preferably 90 to 80 mole %, of ethylene glycol, and 5 to 30 mole %, preferably 10 to 20 mole %, of 1,3-bis(2-hydroxyethoxy)benzene. By using ethylene glycol and 1,3-bis(2-hydroxyethoxy)benzene in the above amounts as the dihydroxy compounds, a copolyester being free from high-melting oligomers and having excellent surface properties and a high glass transition temperature can be obtained.

In addition to ethylene glycol and 1,3-bis(2-hydroxyethoxy)benzene, another dihydroxy compounds may be used in an amount which does not impair the properties of the resulting copolyester. Examples of the other dihydroxy compound include dihydroxy compounds having 3 to 15 carbon atoms such as 1,3-propanediol, 1,4-butanediol, neopentyl glycol, cyclohexanediol, cyclohexanedimethanol, 1,4-bis(2-hydroxyethoxy)benzene, 2,2-bis(4-beta-hydroxyethoxyphenyl)propane and bis(4-beta-hydroxyethoxyphenyl)sulfone.

The copolyester of the invention may be composed only of the above dicarboxylic acid units and the above dihydroxy compound units, or of the dicarboxylic acid units, the hydroxy compound units and a small amount of trifunctional or higher polycarboxylic acid units or polyhydroxy compound units. Polycarboxylic acids having 4 to 15 carbon atoms may be used as the trifunctional or higher polycarboxylic acid. Specific examples may be trimellitic acid, trimesic acid and hemimellitic acid. The trifunctional or higher polyhydroxy compounds may be, for example, polyhydric alcohols having 3 to 15 carbon atoms. Typical examples include 1,1,1-tri(hydroxymethyl)propane, glycerol, 1,2,3-butanetriol, 1,2,3-pentanetriol, and pentaerythritol. Polyesters obtained by co-condensing the trifunctional or higher polycarboxylic acid or polyhydroxy compound with the above dicarboxylic acid and dihydroxy compound are preferred because they have improved uniform stretchability in blow molding.

The proportion of the trifunctional or higher polycarboxylic acid units in the copolyester is 0.01 to 2 moles, preferably 0.005 to 1 mole, per 100 moles of the dicarboxylic acid units, and the proportion of the trifunctional or higher polyhydroxy compound units is 0.01 to 2 moles, preferably 0.05 to 1 mole, per 100 moles of the drihydroxy compound units.

The resulting copolyester of the invention has an intrinsic viscosity, measured in o-chlorophenol at 25° C., of 0.3 to 1.5 dl/g, preferably 0.6 to 1.0 dl/g. If the intrinsic viscosity is less than 0.3 dl/g, the mechanical strength of the copolyester is undesirably degraded. On the other hand, if it exceeds 1.5 dl/g, the copolyester undesirably has degraded melt-moldability.

The copolyester of the invention can be produced by known polycondensation reactions heretofore employed in the production of polyethylene terephthalate. The dicarboxylic acids may be fed to the reaction system as such or their dialkyl esters. They may also be fed as esters of the dicarboxylic acid with a diol such as bis(beta-hydroxyethyl) alcohol.

Likewise, the dihydroxy compounds may be fed as such or in the form of dihydroxy esters of the carboxylic acids.

Known catalysts used in the production of polyethylene terephthalate may be used in the copolycondensation. The catalysts may be, for example, metals such as antimony, germanium and titanium, or their compounds such as the oxides, hydroxides, halides, inorganic acid salts, organic acid salts, complex salts, double salts, alcoholates and phenolates. These catalysts may be used singly or in combination with each other. The catalyst may be supplied to the reaction system at the initial stage of the esterification reaction or ester interchange reaction, or may be supplied to the reaction system before it is switched to the polycondensation reaction stage.

At the time of the cocondensation, there may be used catalysts for ester-interchange reaction, and additives such as inhibitors against formation of diethylene glycol, heat stabilizers, light stabilizers, lubricants, pigments and dyes, which are used in the production of polyethylene terephthalate. Amines such as triethylamine and tri-n-butylamine and quaternary ammonium compounds such as tetraethyl ammonium hydroxide and tetrabutyl ammonium hydroxide may be used as the inhibitors against the formation of diethylene glycol. Examples of the stabilizers such as heat stabilizers are phosphorus compounds such as phosphoric acid, phosphorous acid, hypophosphoric acid and esters of these.

The copolyester of this invention may be produced by a known melt polycondensation method or at times by using a solid-phase polycondensation method after the melt polycondensation method.

In the above melt polycondensation, the so-called direct polycondensation or the so-called esterinterchange polycondensation may be used.

The melt polycondensation method will be described further more specifically. For example, isophthalic acid and 2,6-naphthalenedicarboxylic acid or dicarboxylic acids containing these as main ingredients and ethylene glycol and 1,3-bis(2-hydroxyethoxy)benzene or a condensate thereof with a dicarboxylic acid, and optionally a trifunctional or higher compound containing at least three carboxyl or hydroxyl groups are esterified or ester-interchanged simultaneously or consecutively at a temperature of preferably 100° C. to 280° C., and then polycondensing the resulting pre-polycondensate at a temperature above its melting point, preferably 200° C. to 300° C. under vacuum or in the presence of a flowing inert gas with stirring.

Furthermore, the copolyester of the invention may be produced by subjecting the copolyester obtained by the above melt polycondensation method to solid-phase polycondensation method to increase its molecular weights. Specifically, this solid-phase polycondensation method is carried out by pelletizing the copolyester obtained by the melt polycondensation method and maintaining the pellets at a temperature below the melting point, preferably 180° C. to 240° C., under vacuum or in a stream of an inert gas.

The copolyester of this invention has a higher glass transition temperature than a polyester obtained from isophthalic acid and ethylene glycol, and can be dried more rapidly. Furthermore, the copolyester of this invention has better gas-barrier property than a polyester obtained from terephthalic acid and ethylene glycol.

The copolyester of the invention hardly contains high-melting oligomers, and can give a molded article having excellent surface properties.

The copolyester of the invention can be used as a gas-barrier imparting agent because it has excellent gas-barrier property and surface property and a high glass transition temperature.

The copolyester of the invention may, as required, contain other components such as coloring agents, fillers, polymerization catalysts, and crosslinking agents such as trimellitic anhydride, trimesic acid or triols.

The copolyester of the invention may be used in the unstretched state as a material for articles of various shapes such as films, sheets, fibers and containers to be obtained by ordinary molding methods. When the copolyester in the stretched state is molded into films, sheets and containers, these articles have further improved gas-barrier property.

Since the copolyester of the invention has excellent gas-barrier property, it can be used as a packaging material such as a bottle by using it as a single layer or as a laminate with another layer such as a layer of polyethylene terephthalate, nylon 6 or nylon 66.

Furthermore, a packaging material having excellent gas-barrier property can be prepared by blending the copolyester of the invention with another polyester such as polyethylene terephthalate.

Now, a stretched product of the copolyester of the invention will be described. This stretched product is monoaxially or biaxially stretched and may be in the form of a film, a sheet, a fiber, or a blow-molded container. Where the copolyester is monoaxially stretched, the stretch ratio is usually from 1.1 to 10, preferably from 1.2 to 8, especially preferably from 1.5 to 7. Where the copolyester is stretched biaxially, the stretch ratio is usually from 1.1 to 8, preferably from 1.2 to 7, especially preferably from 1.5 to 6, in the longitudinal direction, and usually from 1.1 to 8, preferably from 1.2 to 7, especially preferably from 1.5 to 6, in the transverse direction. The stretched product may be heat-set according to the purpose for which it is to be used.

As required, the stretched product of the copolyester of the invention may contain suitable amounts of various additives incorporated in conventional polyesters, for example, nucleating agents, inorganic fillers, lubricants, slip agents, antiblocking agents, stabilizers, antistatic agents, antihaze agents, and pigments. The stretched product of the copolyester of the invention may be produced by any of known methods. Generally, a starting molded article such as a film-like material, a sheet-like material or a parison molded from the copolyester or its composition containing the above additives as required is subjected to a stretching treatment, either directly or after it is cooled to a temperature below its glass transition temperature and solidified and then re-heated, at a temperature ranging from its glass transition temperature to its melting point, preferably, from its glass transition temperature to a point 80° C. higher than it. The heat-setting of the stretched product is carried out for a short time at the above stretching temperature or a higher temperature.

If the starting molded article is a film-like article or a sheet-like article, it may be stretched, for example, by a monoaxial stretching method by which it is stretched in one direction, a biaxial stretching method in which it is stretched in the longitudinal direction and then in the transverse direction, a simultaneous biaxial stretching method in which it is stretched in the longitudinal and transverse directions simultaneously, a method by which it is biaxially stretched and then repeatedly stretched in either one direction, a method by which it is biaxially stretched and further in both directions, or a vacuum forming method by which a space between the film- or sheet-like article and the mold is maintained in vacuum to thereby stretch it.

The stretched product of the copolyester may also be produced in the form of a laminate with another resin such as polyethylene terephthalate. Such a laminate may be produced, for example, by a method in which one or more layers of the starting molded article such as a film- or sheet-like article of the copolyester are laminated to one or more layers of a starting molded article such as a film- or sheet-like article of another resin such as polyethylene terephthalate, and the laminate is then stretched, or a method in which a film or sheet-like article of the other resin is bonded to the stretched product of the copolyester of the invention.

If the starting molded article is a parison, a stretch blow-molded container may be produced from it by stretching the parison at the above temperature in the longitudinal direction, and then blow-molded to stretch it further in the transverse direction (biaxial stretch blow molding). Furthermore, if a parison prepared from one or more layers of the copolyester and one or more layers of the other resin is subjected to the above stretch blow molding, laminated blow-molded article composed of the copolyester and the other resin (e.g., polyethylene terephthalate) can be produced.

Since the stretched product of the copolyester of the invention has excellent gas-barrier property, it can be used in various applications. In particular, biaxially stretched blow-molded containers of the copolyester, because of their excellent gas-barrier property, are useful for holding various articles, for example seasonings, oils, beer, wines and liquors, soft or carbonated drinks such as cola, cider and juices, cosmetics and detergent. Particularly, for holding beer or carbonated drinks, the thickness of the containers can be decreased, and the taste of these goods can be preserved for an extended period of time.

The stretched film of the copolyester of the invention may be used for example, as electrically insulating film, magnetic tapes, photographic films, and metal-vapor deposited films.

The polyester composition of this invention comprises (A) 50% to 95% by weight of polyethylene terephthalate and (B) 50% to 5% by weight of a copolyester.

The polyester film, polyester preform and polyester container in accordance with this invention are composed of the above polyester composition.

The polyester composition of this invention consists essentially of the polyethylene terephthalate (A) and the copolyester (B). The dicarboxylic acid units of the copolyester (B) are composed of isophthalic acid units and 2,6-naphthalenedicarboxylic acid units and the dihydroxy compound units are composed of ethylene glycol units and 1,3-bis(2-hydroxyethoxy)benzene units. Accordingly, the composition can be dried at a high speed, and has excellent thermal resistance, impact strength, transparency and gas-barrier property. Furthermore, since it does not contain high-melting oligomers, it has excellent surface properties.

Now, the polyester composition, the polyester film, the polyester preform and the polyester container in accordance with this invention will be described in detail.

The polyethylene terephthalate (A) used in the polyester composition of the invention is a crystalline thermoplastic polyester composed of usually at least 80 mole %, preferably at least 90 mole %, of terephthalic acid units based on the entire dicarboxylic acid units and usually at least 80 mole %, preferably at least 90 mole %, of ethylene glycol based on the entire dihydroxy compound units.

Examples of dicarboxylic acid units other than the terephthalic acid units include units derived from aromatic dicarboxylic acids such as isophthalic acid, diphenylether-4,4-dicarboxylic acid, naphthalene-1,4dicarboxylic acid and naphthalene-2,6-dicarboxylic acid, aliphatic dicarboxylic acids such as oxalic acid, succinic acid, adipic acid, sebacic acid and undecanedicarboxylic acid, or aliphatic dicarboxylic acids such as hexahydroterephthalic acid.

Examples of dihydroxy compounds units other than the ethylene glycol units are units derived from aliphatic dihydroxy compounds such as propylene glycol, 1,4-butanediol and neopentyl glycol, aliphatic dihydroxy compounds such as propylene glycol, 1,4-butanediol and neopentyl glycol, alicyclic dihydroxy compounds such as cyclohexanediol and cyclohexanedimethanol, and aromatic dihydroxy compounds such as 1,3-bis(2-hydroxyethoxy)benzene, 1,4-bis(2-hydroxyethoxy)benzene, 2,2-bis(4-beta-hydroxyethoxyphenyl)propane, bis(4-beta-hydroxyethoxyphenyl)sulfone and bisphenol A.

The polyethylene terephthalate (A) may contain the other dicarboxylic acid units and the other dihydroxy compound units if it contains terephthalic acid units and ethylene glycol units in the amounts indicated above. The polyethylene terephthalate (A) may be used as a mixture with another polyester.

The molecular weight of the polyethylene terephthalate (A) is not particularly limited if it is within a range which can give various molded articles such as a container from the resulting polyester composition. However, polyethylene terephthalate (A) used in this invention desirably has an intrinsic viscosity [$\eta$], measured in o-chlorophenol at 25° C., of at least 0.6 dl/g, preferably at least 0.8 dl/g.

The copolyester (B) contained in the polyester composition is composed of the dicarboxylic acid units and the dihydroxy compound units to be described below, and can be obtained by the copolycondensation of the corresponding dicarboxylic acids and dihydroxy compounds.

If the amount of the isophthalic acid units exceeds 95 mole %, the glass transition temperature of the copolyester (B) does not so much increase. If, on the other hand, it is less than 60 mole %, the glass transition temperature of the copolyester (B) rises too much, and a blend of the copolyester (B) and polyethylene terephthalate (A) cannot sufficiently be stretched.

Since the copolyester (B) contains 2,6-naphthalenedicarboxylic acid units derived from a rigid comonomer, the copolyester has a high glass transition temperature and a high level of gas-barrier property. Accordingly, the polyester composition composed of the copolyester (B) and polyethylene terephthalate (A) can be dried at a high speed during production.

Various known methods may be used to prepare the polyester composition from the polyethylene terephthalate (A) and the copolyester (B). For example, there may be used a method by which the polyethylene terephthalate (A) and the copolyester (B) are mixed by using a Henschel mixer, a V-blender, a ribbon blender, a tumbler blender, etc. Since the copolyester has a high glass transition temperature, even when the two polyesters (A) and (B) are mixed immediately after drying, the copolyester hardly melt-adheres to itself. Accordingly, the two polyesters (A) and (B) can be rapidly mixed after drying. The mixture so prepared may be melt-kneaded by a single-screw extruder, a twin-screw extruder, a kneader or a Bambury mixer, and then granulated or pulverized.

In the resulting polyester composition, the amount of the polyethylene terephthalate (A) is 50% to 95% by weight, preferably 70% to 90% by weight, and the amount of the copolyester (B) is 50% to 5% by weight, preferably 30% to 10% by weight, based on the total weight of the polyester composition.

If the amount of the polyethylene terephthalate (A) is less than 50% by weight, the properties of the polyethylene terephthalate cannot sufficiently be exhibited. On the other hand, if it exceeds 95% by weight, the properties of the copolyester (B) are not fully exhibited.

The resulting polyester composition has a glass transition temperature of usually 75° C. to 85° C., preferably 80° C. to 85° C. Since the polyester composition of the invention has a higher glass transition temperature than a polyester composition comprising a conventional isophthalate-type copolyester, it can be dried at high temperatures, and therefore rapidly.

The polyester composition of this invention may contain ordinary various additives for polyesters, such as heat stabilizers, weather stabilizers, antistatic agents, lubricants, mold releasing agents, pigment dispersing agents, pigments and dyes in amounts which do not impair the objects of this invention.

The polyester composition may be used in various shapes such as a sheet, a plate, a tube, a hollow article or a container.

The polyester film in accordance with this invention is prepared by an ordinary method from the polyester composition described above. The polyester film may either be stretched or unstretched.

The unstretched polyester film desirably has a thickness of usually 50 to 900 micrometers, preferably 200 to 600 micrometers.

The stretched film may be a monoaxially or biaxially stretched film. The stretch ratio of the monoaxially stretched film is desirably from 1.1 to 10, preferably from 1 2 to 8, especially preferably from 1.5 to 7. In the biaxially stretched film, the stretch ratio is usually from 1.1 to 8, preferably from 1.2 to 7, especially from 1.5 to 7.

In the biaxially stretched film, the stretch ratio is desirably from 1.1 to 8, preferably from 1.2 to 7, especially preferably from 1.5 to 6, in the longitudinal direction, and from 1.1 to 8, preferably from 1.2 to 7, especially preferably from 1.5 to 6, in the transverse direction.

The polyester film of this invention can be produced by any known method. Generally, a film-like material molded from the above polyester composition optionally containing the additives, as such or after it is cooled and solidified at a temperature below the glass transition temperature, is re-heated, and this starting molded product is subjected to a stretching treatment at a temperature ranging from the glass transition temperature to its melting point, preferably from the glass transition temperature to a point about 80° C. higher than the glass transition temperature. Heat-setting of the stretched film may be carried out at a temperature higher than the above stretching temperature for a short period.

In the production of the stretched polyester film of this invention, the starting film-like product in the unstretched state may be stretched monoaxially (monoaxial stretching method); stretched in the longitudinal direction and then in the transverse direction (biaxial stretching method); stretched simultaneously in the longitudinal and the transverse directions (simultaneous biaxial stretching method); stretched biaxially and then repeatedly stretching in either direction; stretched biaxially and further in both directions; or may be processed by a so-called vacuum forming method in which a space between the film-like product and a mold is reduced in pressure, thereby to stretch-mold the film-like product.

The polyester composition of this invention may be processed into a sheet-like article substantially in accordance with the methods of producing the polyester film described above.

The polyester preform of this invention may be produced by using the polyester composition.

For example, it may be prepared by injection molding the polyester composition.

The polyester container in accordance with this invention may be produced by press-forming a sheet of the polyester composition, or stretch blow-molding the polyester preform mentioned above.

Stretch blow-molding may be carried out, for example, by stretching the preform in the longitudinal direction at the stretching temperature for the polyester composition, and then blow-molding it to stretch it also in the transverse direction (biaxial stretch blow molding method).

To produce the polyester container from the biaxial stretch blow molding method, a bottomed preform molded by an ordinary injection-molding machine or a parison obtained by bottoming one end of a parison molded by an extrusion-molding machine is stretched to 1.5 to 3.5 times, preferably 2 to 3 times in the longitudinal direction, and 2 to 5 times, preferably 3 to 4.5 times, in the transverse direction at a stretching temperature of 80° C. to 120° C., preferably 90° C. to 110° C. by a rod moving longitudinally within a blow molding mold and the blowing of a pressurized gas. Molding by an injection molding machine may be carried out by a two-stage method using a cold parison or a one-stage method using a hot parison.

To improve the rigidity of the polyester container, a layer of polyethylene terephthalate may be laminated to the inside and outside layers of the polyester composition.

The polyester container of this invention may be used in various applications because of its excellent transparency and gas-barrier property In particular, biaxial stretch blow-molded containers have excellent gas-barrier property and transparency and can be used not only for holding seasonings, oils, wines and liquors, cosmetics and detergents, but also holding sparkling drinks such as cola, cider and beer. The polyester containers of the invention permit prolongation of the period within which goods held therein can be taken with their original tastes and flavors without increasing the thickness of the container wall as in conventional containers.

The polyester laminated structure of this invention is composed of (C) a polyalkylene terephthalate layer and (B) a copolyester layer. The copolyester layer (D) is a layer of the copolyester of the invention described hereinabove, or the above polyester composition of the invention comprising the copolyester and polyethylene terephthalate, in which the layers (C) and (D) are stretched.

The preform for the polyester laminated blow-molded product of this invention is composed of (C) a polyalkylene terephthalate and (D) a copolyester layer which is a layer of the copolyester of the invention described hereinabove, or the above polyester composition of the invention comprising the copolyester and polyethylene terephthalate.

The polyester laminated blow-molded product of this invention is composed of (A) a polyalkylene terephthalate and (D) a copolyester layer. The copolyester layer is a layer of the copolyester of the invention described above and the polyester composition of the invention comprising the copolyester and polyethylene terephthalate.

The polyester laminated structure, the preform for a laminated blow-molded article, and the laminated blow-molded article in accordance with this invention are each composed of the above described specific layers mentioned above, and therefore, have excellent gas-barrier property particularly with respect to oxygen and carbon dioxide, thermal resistance, impact strength, surface properties, transparency, electrical properties and chemical resistance and hardly contain high-melting oligomers.

The polyester laminated structure, the preform for a laminated blow-molded article, and the laminated blow-molded article in accordance with this invention will be described below specifically.

The polyalkylene terephthalate layer (C) of the polyester laminated structure of the invention is formed of a polyalkylene terephthalate such as polyethylene terephthalate and polypropylene terephthalate, preferably polyethylene terephthlate.

The polyethylene terephthalate used in this invention is as described hereinabove.

The molecular weight of polyethylene terephthlate used in this invention is not particularly limited if the resulting polyester laminated structure can be molded into various articles such as a container. Desirably, however, the polyethylene terephthalate has an intrinsic viscosity $[\eta]$, measured at 25° C. in o-chlorophenol, of usually at least 0.6 dl/g, preferably at least 0.8 dl/g.

When polypropylene terephthalate, for example, is used as the polyalkylene terephthalate, propylene glycol may be used in place of ethylene glycol. The polypropylene terephthalate so obtained has an intrinsic viscosity, measured at 25° C. in o-chlorophenol, of usually 0.8 to 1.2 dl/g. This polypropylene terephthalate may be used as a mixture with another polyester.

The copolyester layer (D) of the polyester laminated structure in this invention may be formed from the above copolyester or a polyester composition comprising the copolyester and polyethylene terephthalate described hereinabove. If the proportion of isophthalic acid units constituting the above copolyester exceeds 95 mole %, the glass transition temperature of the copolyester do not so much increase. If it is less than 60 mole %, the glass transition temperature of the copolyester increases excessively, and the polyester laminated structure composed of the copolyester layer (D) and the polyalkylene terephthalate layer (C) can be stretched only with reduced stretchability of the copolyester layer (D).

In the present invention 2,6-naphthalenedicarboxylic acid units derived from a rigid comonomer component are included as units constituting the copolyester. Hence, the copolyester has a high glass transition temperature and hardly contain high-melting oligomers. The gas-barrier property of the laminated structure can be maintained at a high level.

The polyester composition used in the production of the polyester laminated structure has a higher glass transition temperature than a polyester composition comprising a conventional isophthalate-type copolyester, and therefore can be dried rapidly at a high temperature, and the polyester laminated structure of the invention can be produced efficiently.

Specific examples of the laminated structure are shown below.

A two-layer laminated structure composed of one copolyester layer (D) and one polyalkylene terephthalate layer (C);

a three-layer laminated structure composed of two outside layers of the polyalkylene terephthalate (C) and an interlayer of the copolyester (D);

a multilayer laminated structure having four or more layers composed of alternately laminated layers of the copolyester (D) and layers of alkylene terephthalate (C), in which both outermost layers are composed of the polyalkylene terephthalate (C);

a multilayer laminated structure having four or more layers composed of alternately laminated layers of the copolyester (D) and layers of alkylene terephthalate (C), in which both outermost layers are composed of the copolyester (D); and a multilayer laminated structure having four or more layers composed of alternately laminated layers of the copolyester (D) and layers of alkylene terephthalate (C), in which one of the outermost layers is composed of the copolyester layer (D) and the other, of the polyalkylene terephthalate layer (C).

The laminated structures may be used in the form of a sheet, a plate, a tube, a hollow body or a container, and can be produced by known methods.

There is no particular restriction on the thicknesses of the copolyester layer (D) and the polyalkylene terephthalate layer (C) and may be determined according to the use to which the resulting laminate structure is to be put. For example, when this laminated structure is a two-layer structure, the thickness of the copolyester layer (D) is usually 50 to 500 micrometers, preferably 50 to 300 micrometers, and the thickness of the polyalkylene terephthalate layer (C) is 50 to 300 micrometers, preferably 50 to 200 micrometers. When the laminated structure is the first-mentioned three layer structure, the thickness of the copolyester layer (D) is usually 50 to 500 micrometers, preferably 50 to 200 micrometers. The thickness of each of the outside polyalkylene terephthalate layer (C) is usually 50 to 500 micrometers, preferably 50 to 300 micrometers. If the laminated structure is the latter-mentioned three-layer structure, the thickness of the polyalkylene terephthalate interlayer is usually 50 to 500 micrometers, preferably 50 to 300 micrometers, and the thickness of copolyester outside layers (C) is usually 50 to 500 micrometers, preferably 50 to 200 micrometers. When the laminated structure is a multilayer structure, the thicknesses of the intermediate layer and both outside layers of the copolyester (D) and the thicknesses of the intermediate layer and outermost layers composed of the polyalkylene terephthalate layer (C) may be prescribed in the same way as above.

The laminated structure of the invention has excellent stretchability, electrical properties, particularly electrical insulation, mechanical strength, transparency and gas-barrier property.

The polyester stretched laminated structure of the invention may be produced by any known methods. Generally, a starting molded article such as a film or sheet obtained by laminating the polyalkylene terephthalate layer (C) and the copolyester layer (D), either as such or after cooling and solidifying it to a temperature below the glass transition temperature of the polyalkylene terephthalate and the copolyester, is stretched at a temperature above the glass transition temperature of both, preferably 70° C. to 100° C.

The polyester stretched laminated molded structure of the invention can be produced by, for example monoaxially, stretching an unstretched film or sheet (when the starting molded article is film or sheet) (monoaxial stretching method); stretched in the longitudinal direction and then in the transverse direction (biaxial stretching method); stretched biaxially and then repeatedly stretched in either direction; or biaxially stretched and then further stretched in both directions. When the starting structure is to be monoaxially stretched, the stretch ratio is usually from 1.1 to 10, preferably from 1.2 to 8, especially preferably from 1.5 to 7. In the production of the starting molded structure by biaxial stretching, the stretch ratio is usually from 1.1 to 8, preferably from 1.2 to 7, especially preferably from 1.5 to 6, in the longitudinal direction, and usually from 1.1 to 8, preferably from 1.2 to 7, especially preferably from 1.5 to 6, in the transverse direction. The resulting stretched laminated molded structure may be heat-set.

The polyester stretched laminated structure of the invention has excellent mechanical strength, transparency, electrical properties and gas-barrier property. In particular, by using this molded structure for forming electrical and electronic component parts and metallic parts, it is effective for protecting electrical and electronic circuits and preventing corrosion of metals. The polyester stretched laminated structure in the form of a film can also be effectively used for capacitors, motors, transformers and wire and cable coatings by utilizing its electrical properties. Furthermore, by utilizing its excellent gas-barrier property, it may be used as a film for food packaging.

The preform for the polyester laminated blow-molded article of the invention may be produced by using the polyester laminated structure of the invention.

For example, by molding and processing the polyester laminated structure in tubular form, the preform of the invention can be obtained.

The polyester laminated blow-molded article of this invention is a stretch blow-molded article formed from the above polyester laminated structure. The stretched blow-molded article may be produced by stretch blow-molding the above preform.

The polyester laminated blow-molded article may be monoaxially or biaxially stretched. The biaxially stretched polyester laminated blow-molded article has outstanding mechanical strength and gas-barrier property.

The stretch ratios used in the production of the polyester laminated blow-molded article in this invention may be the same as those described above with regard to the stretched polyester laminated structures.

The polyester laminated blow-molded article may be produced by stretching and blow-molding the preform described above. The stretch blow molding may be carried out by stretching the preform in the longitudinal direction at temperatures within the range of the stretching temperatures for the laminated structure, and further blow-molding the stretched preform to stretch it in the transverse direction (biaxial stretching blow-molding method).

For example, a polyester container may be produced in accordance with the biaxial stretching blow-molding method by stretching a bottomed parison molded by an ordinary injection-molding machine, or a parison obtained by bottoming one end of a parison molded by an extrusion molding machine at a temperature of 80° C. to 120° C., preferably 90° C. to 110° C., to 1.5 to 3.5 times in the longitudinal direction, and to 2 to 5 times, preferably 3 to 4.5 times in the transverse direction by a rod moving longitudinally within a blow-molding mold and the blowing of a pressurized gas. Particularly, a biaxially stretched blow-molded container as the polyester laminated blow-molded article of the invention has excellent gas-barrier property and transparency, and is suitable therefor for holding not only seasonings, oils, wines and liquors, cosmetics and detergents but also for holding sparkling drinks such as cola, cider and beer as stated hereinabove.

The following examples illustrate the present invention specifically.

In these examples, the various properties were measured by the following methods.

Intrinsic viscosity of the polyester

Measured in an o-chlorophenol solution of the polymer at 25° C.

Composition of the polyester

Determined by measuring the nuclear magnetic resonance spectrum of the polyester in a trichloroacetic acid solution.

Glass transition temperature of the polyester

Measured by a differential scanning calorimeter at a temperature elevating rate of 10° C./min.

Oxygen gas permeation coefficient

Measured at 25° C. by an OXTRAN device made by MOCON company.

Carbon dioxide gas permeability coefficient

Measured at 25° C. by using a PERMATRAN C-IV device made by MOCON company.

EXAMPLE A1

A copolyester composed of isophthalic acid (IA), 2,6-naphthalenedicarboxylic acid (NDA), 1,3-bis(2-hydroxyethoxy)benzene (DER) and ethylene glycol (EG) was produced by the following procedure.

A 1-liter stainless steel reactor equipped with a stirrer, a nitrogen gas inlet and a condenser was charged with 122.5 g of isophthalic acid, 17.7 g of naphthalenedicarboxylic acid, 94.8 g of ethylene glycol, 24.4 g of 1,3-bis(2-hydroxyethoxy)benzene, 0.33 g of 1,1,1-trishydroxymethylpropane, 0.058 g of titanyl acetylactonate, 0.077 g of $Sb_2O_3$, 0.010 g of tetrasodium ethylenediaminetetraacetate, and 0.027 g of manganese hypophosphate monohydrate.

The reaction mixture was heated in an atmosphere of nitrogen at 220° C. for 1 hour and then at 240° C. for 25 minutes. During this time, water was continuously evaporated.

Then, 0.164 g of tris(nonylphenyl) phosphite was added to the mixture in the reactor.

The reaction temperature was raised to 250° C., and maintained for 35 minutes in a nitrogen atmosphere.

The flowing of the nitrogen gas was stopped, and a reduced pressure of less than 4 mmHg was applied. The reaction was continued at 275° C. for 4 hours under less than 0.4 mmHg. The resulting copolyester had an intrinsic viscosity of 0.83 dl/g. It had a glass transition temperature of as high as 70° C. The carbon dioxide gas permeability coefficient was 3.0 cc.mm/m$^2$ day.atm, and it had good gas-barrier property.

EXAMPLES A2 and A3 and COMPARATIVE EXAMPLES A-1 to A-6

Copolyesters having the compositions indicated in Table 1 were synthesized as in Example A1. Sheets were formed from the copolyesters, and their gas-barrier properties were measured.

The results are shown in Table 1.

TABLE 1

| Run (*) | Composition of the copolyester (mole %) | Tg (°C.) | Pco$_2$ (cc · mm/m$^2$ · day · atm) | [η] (dl/g) |
|---|---|---|---|---|
| Ex. A1 | IA/NDA/DER/EG 90/10/15/85 | 73 | 3.0 | 0.83 |
| Ex. A2 | IA/NDA/DER/EG 80/20/15/85 | 78 | 3.1 | 0.81 |
| Ex. A3 | IA/NDA/DER/EG 70/30/15/85 | 84 | 3.3 | 0.83 |
| CEx. A1 | TA/EG 100/100 | 78 | 21.8 | 0.75 |
| CEx. A2 | IA/EG 100/100 | 67 | 3.0 | 0.80 |
| CEx. A3 | NDA/EG 100/100 | 124 | 7.2 | 0.80 |
| CEx. A4 | IA/NDA/DER/EG 50/50/15/85 | 90 | 4.2 | 0.80 |
| CEx. A5 | IA/TA/EG/DER 70/30/85/15 | 69 | 3.8 | 0.78 |
| CEx. A6 | IA/TA/EG/DER/BSE 70/30/72/15/12 | 78 | 5.1 | 0.81 |

Ex. = Example;
CEx. = Comparative Example

The total amount of the dicarboxylic acid and the dihydroxy compound was 100 mole %.

The following abbreviations were used.
IA: isophthalic acid
NDA: 2,6-naphthalenedicarboxylic acid
TA: terephthalic acid
DER: 1,3-bis(2-hydroxyethoxy)benzene
EG: ethylene glycol
BSE bis(4-beta-hydroxyethoxyphenyl)sulfone

EXAMPLES B1 to B6 and COMPARATIVE EXAMPLES B1 to B8

One hundred parts of polyethylene terephthalate (Mitsui PET J135, a product of Mitsui PET Resin Co., Ltd.) dried at 150° C. for 10 hours was mixed with each of the amounts indicated in Table 2 of the copolyester obtained in Example A1. The mixture was melt-extruded at a molding temperature of about 250° C. to 290° C. by an extruder, cooled and cut by a cutter to form pellets of a polyester composition composed of polyethylene terephthalate and the copolyester. The pellets were press-formed to prepare a press sheet having a thickness of about 600 micrometers. The press sheet was stretched simultaneously by a biaxially stretching device to three times both in the longitudinal and transverse directions to obtain a biaxially stretched film.

The resulting biaxially stretched film has a thickness of about 50 microns, there was no thickness unevenness, and it was uniformly stretched. The transparencies and the carbon dioxide gas permeability coefficients of the press sheet and the biaxially stretched film are shown in Table 2.

The compositions obtained by mixing PET with the copolyesters of Comparative Examples A2 and A5 had a decreased glass transition temperature as compared with the compositions prepared by mixing PET with the copolyesters of Examples A1, A2 and A3. Furthermore, when the copolyesters of Comparative Examples A5 and A6 were mixed with PET, the effect of improving the oxygen gas permeability coefficient was small

TABLE 2

| Run | Copolyester Type (example designation) | Amount (wt. %) | Tg of the composition (°C.) | Properties of the biaxially stretched film of the composition | |
|---|---|---|---|---|---|
| | | | | Haze (%) | CO$_2$ gas permeability coefficient (cc · mm/m$^2$ · day · atm) |
| Ex. B1 | Ex. A1 | 10 | 77 | 0.6 | 9.1 |
| Ex. B2 | Ex. A2 | 10 | 78 | 0.6 | 9.3 |
| Ex. B3 | Ex. A3 | 10 | 79 | 0.6 | 9.5 |
| CEx. B1 | CEx. A2 | 10 | 73 | 2.0 | 9.1 |
| CEx. B2 | CEx. A4 | 10 | 79 | 1.0 | 10.1 |
| CEx. B3 | CEx. A5 | 10 | 73 | 0.7 | 9.9 |
| CEx. B4 | CEx. A6 | 10 | 78 | 1.2 | 10.6 |
| Ex. B4 | Ex. A1 | 20 | 77 | 0.8 | 7.5 |
| Ex. B5 | Ex. A2 | 20 | 78 | 0.8 | 7.6 |
| Ex. B6 | Ex. A3 | 20 | 79 | 0.9 | 7.9 |
| CEx. B5 | CEx. A2 | 20 | 70 | 2.8 | 7.5 |
| CEx. B6 | CEx. A4 | 20 | 80 | 1.2 | 8.7 |
| CEx. B7 | CEx. A5 | 20 | 70 | 0.8 | 8.7 |
| CEx. B8 | CEx. A6 | 20 | 78 | 1.4 | 9.4 |

EXAMPLES B7 to B9 and COMPARATIVE EXAMPLES B9 to B11

The composition of polyethylene terephthalate and the copolyesters prepared in Examples B1, B3 and B5 were each injection-molded at a molding temperature of about 270° C. by an injection-molding machine to form preforms (cold parison). Each of the preforms was biaxially stretched and blow-molded to about 2.5 times in the longitudinal direction and about 4 times in the transverse direction to produce a stretched bottle having an inner capacity of about 1 liter.

The above procedure was repeated using the polyester compositions of Comparative Examples B3, B5 and B7.

The hazes of the side surfaces of the stretched bottles and their carbon dioxide gas permeabilities were measured, and the results are shown in Table 3.

TABLE 3

| Run | Composition (example designation) | Properties of the biaxially stretched bottle | |
|---|---|---|---|
| | | Haze (%) of the side surface of the bottle | CO$_2$ gas permeation coefficient (cc/day · bottle · atm) |
| Ex. B7 | Ex. B1 | 1.8 | 1.5 |
| Ex. B8 | Ex. B3 | 2.0 | 1.5 |
| Ex. B9 | Ex. B5 | 2.4 | 1.6 |
| CEx. B9 | CEx. B3 | 2.8 | 2.1 |
| CEx. B10 | CEx. B5 | 2.0 | 1.9 |
| CEx. B11 | CEx. B7 | 3.0 | 2.8 |

EXAMPLE C1

Polyethylene terephthalate (Mitsui PET J135, a product of Mitsui PET Resin Co., Ltd.) dried at 150° C. for 10 hours was press-formed at about 260° C. to prepare a press sheet having a thickness of about 100 micrometers.

Separately 100 parts of the polyethylene terephthalate was mixed with 20 parts of the copolyester of Example A1, and the mixture was melt-extruded at 260° C. to 280° C. by using an extruder to produce pellets of the composition. The pellets of the composition were press-formed at about 260° C. to prepare a press sheet having a thickness of about 100 micrometers. The above polyethylene terephthalate press sheet was laid over the press sheet of the composition, and the assembly was press-formed at about 260° C. to give a two-layer laminated sheet having a thickness of about 600 micrometers. The resulting laminated sheet had good adhesion between the polyethylene terephthalate layer (C) and the polyester composition layer (D) and had a haze of 1.2%. The carbon dioxide gas permeability coefficient was 15.5 cc.mm/m$^2$.day.atm.

The laminated sheet was simultaneously stretched in the longitudinal and transverse direction to 3 times by a biaxially stretching device to prepare a biaxially stretched film having a thickness of about 50 micrometers. The film was in the uniformly stretched state. The biaxially stretched film also shows good adhesion between the polyethylene terephthalate layer (C) and the polyester composition layer (D). The film had a haze of 0.6%, and a carbon dioxide gas permeability coefficient of 10.0 cc.mm/m$^2$.day.atm.

EXAMPLES C2 and C3 and COMPARATIVE EXAMPLES C1 to C4

In the same way as in Example C1, press sheets and biaxially stretched films were prepared except that the copolyesters indicated in Table 4 were used. The haze values and carbon dioxide gas permeability coefficients of the products are shown in Table 4.

TABLE 4

| | Copolyester | | Properties of the press sheet of the laminated structure | | Properties of the biaxially stretched film of the laminated structure | |
|---|---|---|---|---|---|---|
| Run | Type (example designation) | Amount (parts by weight) | Haze (%) | CO$_2$ gas permeability coefficient (cc · mm/m$^2$ · day · atm) | Haze (%) | CO$_2$ gas permeability coefficient (cc · mm/m$^2$ · day · atm) |
| Ex. C1 | Ex. A1 | 20 | 1.2 | 15.5 | 0.6 | 10.0 |
| Ex. C2 | Ex. A2 | 20 | 1.6 | 15.7 | 0.8 | 10.1 |
| Ex. C3 | Ex. A3 | 20 | 1.8 | 16.0 | 0.9 | 10.2 |
| CEx. C1 | CEx. A2 | 20 | 5.2 | 15.5 | 2.1 | 10.0 |
| CEx. C2 | CEx. A4 | 20 | 2.4 | 17.2 | 1.2 | 10.6 |
| CEx. C3 | CEx. A5 | 20 | 1.6 | 17.0 | 0.8 | 11.0 |
| CEx. C4 | CEx. A6 | 20 | 2.8 | 19.0 | 1.4 | 11.0 |

EXAMPLE C4

The polyethylene terephthalate in Example C1 was injection-molded, and then a composition composed of 100 parts of the polyethylene terephthalate in Example C1 and 20 parts of the copolyester in Example A1 was also injection-molded to form a preform having an inside layer of the polyethylene terephthalate (C) and an outside layer of the polyester composition (D) composed of the copolyester and the polyethylene terephthalate each of the layers having a thickness of about 1.6 mm.

The resulting preform was heated to 85 to 95° C. by using a far-infrared heater, and then stretched to about 2.5 times in the longitudinal direction and to about 4.3 times in the transverse direction by stretching blow-molding machine to prepare a two-layer stretched bottle having an inner capacity of about 1 liter in which the polyethylene terephthalate layer (C) in the minimum thickness portion was about 150 micrometers thick, and the polyester composition layer (D) was about 150 micrometers thick. The haze of the side surface of the stretched bottle was 1.5%. The carbon dioxide gas permeability of this bottle was 2.0 ml/day bottle.atm.

COMPARATIVE EXAMPLE C5

A preform composed only of polyethylene terephthalate and having the same thickness (about 3.2 mm) of the preform in Example C5 was prepared by injection molding the polyethylene terephthalate used in Example 1. The preform was then stretched and blow-molded to prepare a stretched bottle having an inner capacity of about 1 liter in which the minimum thickness portion was about 300 micrometers thick.

The side surface of the stretched bottle had a haze of 4.5%, and the carbon dioxide gas permeability of the stretched bottle was 2.0 ml/day bottle.atm.

We claim:

1. A copolyester having an intrinsic viscosity, measured in o-chlorophenol at 25° C., of 0.3 to 1.5 dl/g and being derived from dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2hydroxyethoxy)benzene units.

2. A copolyester according to claim 1 having an intrinsic viscosity, measured in o-chlorophenol at 25° C., of 0.6 to 1.0 dl/g and being derived from dicarboxylic acid units composed of 90 to 70 mole % of isophthalic acid units and 10 to 30 mole % of 2,6-naphthalenedicarboxylic acid units and dihydroxy compound units composed of 90 to 80 mole % of ethylene glycol units and 10 to 20 mole % of 1,3-bis(2-hydroxyethoxy)benzene units.

3. The copolyester of claim 2 which further comprises 0.01 to 2 mole, per 100 mole of the dihydroxy compound units, of trifunctional or higher-functional polyhydroxy compound units.

4. The copolyester of claim 2 which further comprises 0.05 to 1 mole, per 100 moles of the dihydroxy compound units, of 1,1,1-tris(hydroxymethyl)propane units.

5. A gas-barrier property imparting agent comprising a copolyester having an intrinsic viscosity, measured in o-chlorophenol at 25° C., of 0.3 to 1.5 dl/g and being derived from dicarboxylic acid units composed of 95 to 60 mole % of isophthalic acid units and 5 to 40 mole % of 2,6-naphthalenedicarboxylic acid units and dihydroxy compound units composed of 95 to 70 mole % of ethylene glycol units and 5 to 30 mole % of 1,3-bis(2hydroxyethoxy)benzene units.

6. A gas-barrier property imparting agent according to claim 5 comprising a copolyester having an intrinsic viscosity, measured in o-chlorophenol at 25° C., of 0.6 to 1.0 dl/g and being derived from dicarboxylic acid units composed of 90 to 70 mole % of isophthalic acid units and 10 to 30 mole % of 2,6-naphthalenedicarboxylic acid units and dihydroxy compound units composed of 90 to 80 mole % of ethylene glycol units and 10 to 20 mole % of 1,3-bis(2-hydroxyethoxy)benzene units.

7. The gas-barrier property imparting agent of claim 6 in which the copolyester further comprises 0.01 to 2 moles, per 100 moles of the dihydroxy compound units, of trifunctional or higher-functional polyhydroxy compound units.

8. The gas-barrier property imparting agent of claim 6 in which the copolyester further comprises 0.05 to 1 mole, per 100 moles of the dihydroxy compound units, of 1,1,1-tris(hydroxymethyl)propane units.

* * * * *